United States Patent [19]

Goetz

[11] Patent Number: 4,786,024
[45] Date of Patent: Nov. 22, 1988

[54] AN ADJUSTABLE SEAT

[75] Inventor: Leo Goetz, Kuemmersbruck, Fed. Rep. of Germany

[73] Assignee: Grammer Sitzsysteme GmbH, Amberg, Fed. Rep. of Germany

[21] Appl. No.: 24,591

[22] Filed: Mar. 11, 1987

[30] Foreign Application Priority Data

Apr. 5, 1986 [DE] Fed. Rep. of Germany ....... 3611512

[51] Int. Cl.⁴ ............................................ F16M 13/00
[52] U.S. Cl. .................................... 248/422; 248/157
[58] Field of Search .............. 248/422, 157, 419, 421, 248/424, 425, 430; 297/339; 296/65 R

[56] References Cited

U.S. PATENT DOCUMENTS

| | | |
|---|---|---|
| 3,473,776 | 10/1969 | Costin .................................. 248/419 |
| 3,700,203 | 10/1972 | Adams .................................. 248/419 |
| 3,826,457 | 7/1974 | De Longchamp ............. 248/421 X |
| 4,085,962 | 4/1978 | Wahls ................................ 296/65 R |
| 4,387,874 | 6/1983 | Boisset ......................... 297/339 X |
| 4,520,986 | 6/1985 | Liljequist et al. ................ 248/419 X |
| 4,648,575 | 3/1987 | Kawade ........................... 248/421 X |
| 4,648,578 | 3/1987 | Sakamoto ....................... 248/422 X |

Primary Examiner—Ramon O. Ramirez
Attorney, Agent, or Firm—Hoffmann & Baron

[57] ABSTRACT

In a sprung seat having a scissors-type support assembly with mutually crossing arms for supporting a vertically movable seat portion relative to a base frame, a spring operable to urge the seat portion upwardly thereby to support the weight of the seat occupant acts by way of a slider on a cam lever non-rotatably connected to a support arm. The slider is adjustable in respect of its length for the purposes of height adjustment of the seat portion.

6 Claims, 3 Drawing Sheets

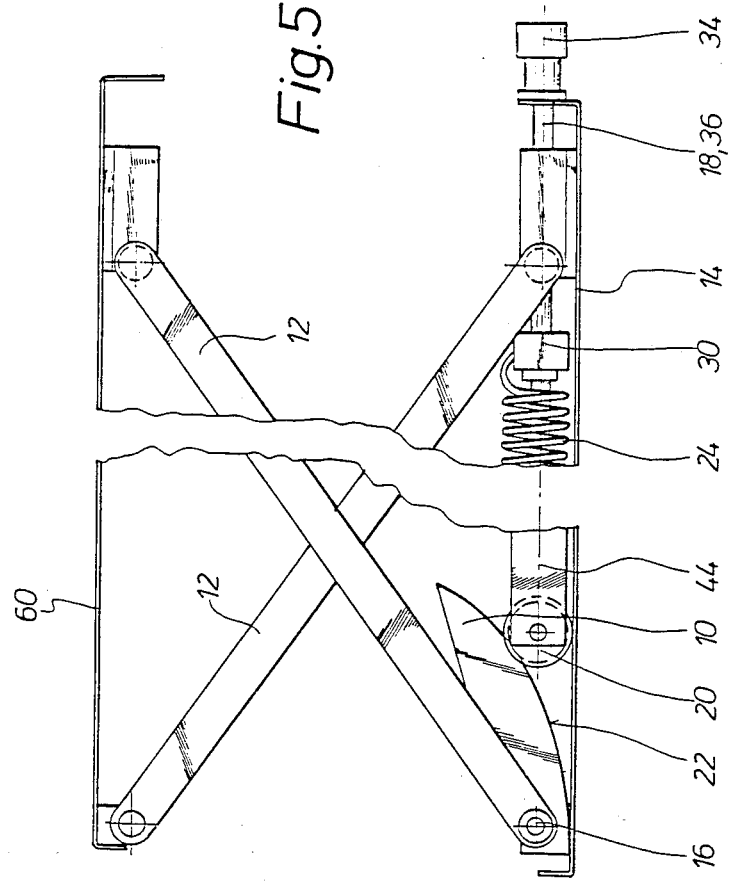

4,786,024

AN ADJUSTABLE SEAT

BACKGROUND OF THE INVENTION

The invention relates generally to a seat and more particularly but not exclusively a seat for a vehicle.

One form of seat which is adjustable in respect of height comprises a seat portion which is supported relative to a base frame by means of a support arrangement consisting of two pairs of support arms at respective sides of the base frame. Each pair of support amrs comprises first and second arms which intersect each other at a position intermediate their ends, thereby defining a scissor-like configuration. The first end of each of the arms is connected slidably to either the seat portion or the base frame while the second end of each of the arms is non-slidably connected to the base frame or to the seat portion respectively. The seat structure further includes a cam lever which is connected rotatably to the non-slidable ends of the arms, at the seat portion or the base frame respectively, and a slider which is mounted slidably in the longitudinal or fore-and-aft direction of the seat and which with its one end acts on the cam lever to cause rotary movement thereof upon sliding movement of the slider. A spring has one end fixed to the slider and the other end connected either to the seat portion or to the base frame respectively, for supporting the seat portion relative to the base frame The spring is thus operable to urge the seat portion upwardly, to carry the weight of a seat occupant. The seat further includes an arrangement for adjusting the height of the seat portion.

Such a seat is set forth for example in British patent specification No 965 072 or German published specification (DE-AS) No 24 46 516. In that structure, adjustment in respect of the height of the seat is effected by altering the angle between the non-slidable ends of the arms and the cam lever which is connected thereto. However, the fact that the cam lever is to be rotatable relative to the arms involves a substantial amount of mechanical structure to achieve that aim. Furthermore, the arrangement requires a strong locking or detent means to secure the cam lever with respect to the corresponding ends of the arms, once adjustment of the angle between the cam lever and the arms has been effected.

SUMMARY OF THE INVENTION

An object of the present invention is to simplify height adjustment in a variable-height seat.

Another object of the present invention is to provide a seat with quickly and easily operable adjusting means to adjust the height of the seat portion in response to varying occupant weight.

Still another object of the present invention is to provide a seat for a vehicle which is adjustable in respect of height and which automatically provides at least substantially the same springing characteristic over at least a major part of the range of heightwise adjustment.

In accordance with the present invention, these and other objects are achieved by means of a seat comprising a base frame and a seat portion which is supported relative to the base frame in a variable-height manner, by first and second support assemblies connecting the seat portion to the base frame at respective sides thereof. Each support assembly has first and second mutually intersecting support arms, the first end of each such arm being connected to either the seat portion or the base frame slidably with respect thereto while the second end of each arm is non-slidably but rotatably mounted to the base frame or the seat portion respectively. A cam lever is operatively connected to the respective second ends of at least one arm of each said pair, while a slider is displaceable in the longitudinal or fore-and-aft direction of the seat, with a first end thereof co-operating with the cam lever. The seat further comprises at least one spring having a first end secured to the seat portion or the base frame to which the second ends of the arms are suitably connected, while its second end is connected to the slider, thereby to support the seat portion in relation to the base frame. An arrangement for heightwise adjustment of the seat portion relative to the base frame comprises means for adjusting the slider in respect of its length. The length of the slider is for example the distance between the first end where it co-operates with the cam lever and the point of mounting of the spring to the slider.

It might be noted at this juncture that above-mentioned German published specification No 2 446 516 which is one twelve years later than also above-mentioned British patent specification No 965 072 still utilised the principle of making the angle between the cam lever and the associated arm adjustable, for the purposes of adjustment of the height of the seat, with which both those publications were concerned. One reason for not deviating from that principle is that virtually the same springing characteristic is automatically retained over the entire height of adjustment of the seat, if, when the seat is adjusted to different heights, it is always the same portion of the cam surface of the cam lever which is operatively associated with the slider, in the course of springing movement of the seat portion relative to the base frame.

In that respect, it may be noted that, in the above-defined seat structure according to the invention, the slider engages different parts of the cam surface of the cam lever when the seat portion is adjusted at different heights relative to the base frame and thus the portions of the cam surface over which the co-operating part of the slider moves upon springing movement of the seat portion at different heights of adjustment thereof are also different. However, by suitable selection of the cam configuration, it is still possible at least approximately to retain the same sprining characteristic at different adjusted heights of the seat portion.

It may be noted that the cam lever of the seat structure according to the invention has to be of larger dimensions than the cam lever of the known structures as referred to above. However, it should also be appreciated that it is substantially simpler to make the slider adjustable in respect of its length, for example by virtue of the use of an adjusting spindle which can be rotated to vary the effective length of the slider, than to provide a strong locking or detent device to fix the cam lever relative to the associated arm, such a device generally also being complicated and therefore liable to cause troubles in operation, as noted above. In accordance with the teachings of the present invention the angle between the cam lever and the associated arm remains constant over the complete length of the range of heightwise adjustment so that the connection between the cam lever and the arm can be really strong.

In a preferred feature of the invention the second ends of the arms of the support assemblies which are associated with a said cam lever are interconnected by a shaft which extends transversely of the seat and the cam lever is fixedly mounted on the shaft intermediate said ends of the arms. In addition, the seat may comprise at least one coil tension spring operatively connected between the slider and the part of the seat to which the spring is also connected, namely either the seat portion or the base frame.

Further objects, features and advantages of the invention will be apparent from the following description of a preferred embodiment thereof.

BRIEF DESCRIPTION OF THE DRAWINGS

FIG. 5 is an elevated side view of a schematic drawing of the scissors-type support assembly and adjustment mechanism of the present invention.

DESCRIPTION OF THE PREFERRED EMBODIMENT

Figure 1:
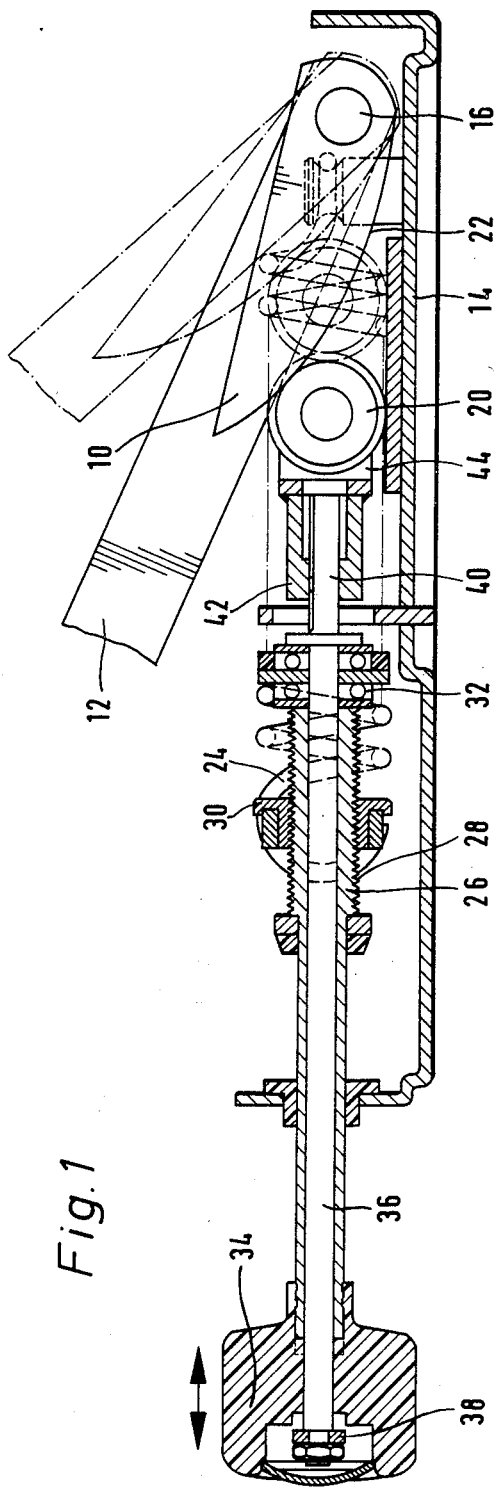
FIG. 1 is a partly sectional side view of a portion of an embodiment of the seat according to the invention.
Figure 4:
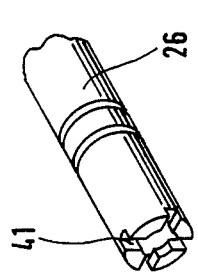
FIG. 4 is a further detail from the structure shown in FIG. 3.

Referring firstly to FIG. 5, shown therein is a diagrammatic side view of a seat in accordance with the invention. FIG. 1 does not show the complete structure of the seat but illustrates only an end region of a support arm 12 which is non-rotatably connected to a cam lever 10, as can be seen from FIGS. 1 and 2. As illustrated in FIG. 5, the arm 12 is arranged in such a way as to cross or intersect another support arm, thereby forming a support assembly disposed at one side of the seat. A similar support assembly is also disposed at the other side of the seat. The support assemblies thus constitute scissor-like support arrangements which interconnect a seat portion 60 and a base frame indicated generally at 14 in FIGS. 1, 2 and 5. The arm 12 is pivotally but non-slidably connected to the base frame 14 at one end thereof, being the lower end as shown in FIGS. 1 and 5, while the other end of the arm 12 is connected to the seat portion slidably with respect thereto, to permit the seat portion 60 to move substantially vertically relative to the base frame 14, to provide height adjustment. It would be possible to reverse that arrangement, in other words the lower end of the arm could be slidable relative to the base frame while the upper end of the arm 12 could be pivotally mounted to the seat portion 60. As can be seen more clearly from FIG. 2, the arm 12 is connected by way of a transversely extending shaft 16 to the second corresponding arm which is diposed at the other side of the seat and which is not visible in the view shown in FIG. 1, since it is disposed in alignment therewith. The above-mentioned cam lever 10 is fixed on the shaft 16 substantially centrally between the two arms 12. It will be noted that, unlike the known arrangements referred to above, the invention makes no provision for adjustment of the angle between the arms 12 and the cam lever 10, insofar as both the cam lever 10 and the arms 12 are fixed on the shaft 16, for example as by welding.

Figure 2:
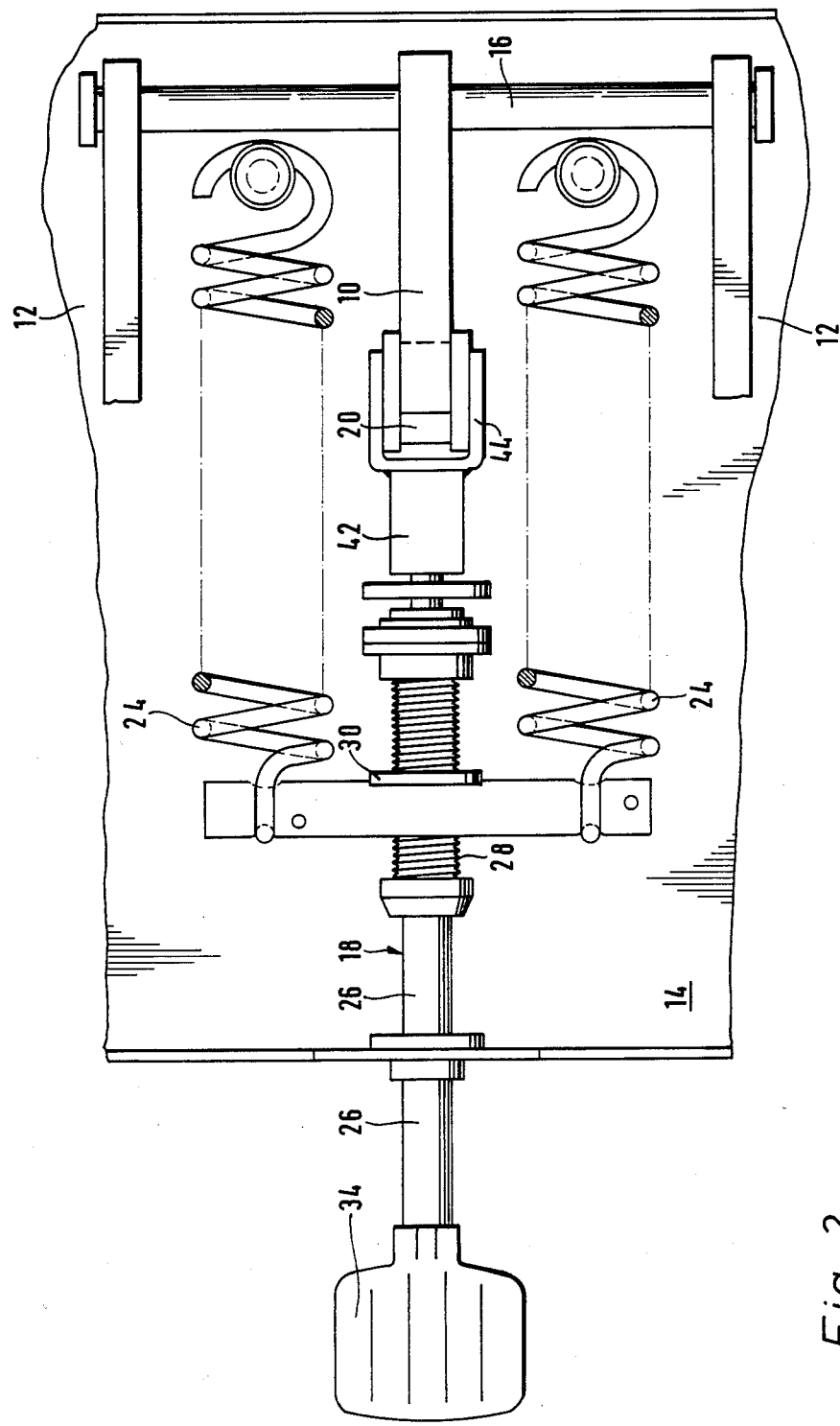
FIG. 2 is a plan view of the part of the seat shown in FIG. 1.

The seat further comprises a slider which is indicated generally at 18 in FIG. 2 and which is slidable in the longitudinal or foreand-aft direction of the seat on the base frame 14. At one end, the slider carries a rotary member 20 such as a roller which bears against the curved cam surface 22, as indicated in FIG. 1, of the cam lever 10.

At least one spring and as illustrated in FIG. 2 first and second springs 24 in the form of coil tension springs are secured by one end to the base frame 14 by suitable mounting pins while the other end of the or each spring is connected to the slider 18 at a location thereon spaced from the first end where the roller 20 is disposed. The position at which the second end of each of the springs 24 is connected to the slider 18 is variable in order to adjust the spring biasing action of the seat in an upward direction, in order for example to give the same seating height when the seat is occupied by persons of different weights. For that purpose, the slider further comprises a tube 26 which extends in the longitudinal direction of the seat and which is provided thereon with a male screwthread 28 on which is screwed a nut 30 connected to the part of the slider to which the second ends of the springs 24 are connected, as can be clearly seen from both FIGS. 1 and 2. The nut 30 is held in the slider non-rotatably relative thereto while the tube 26 is mounted rotatably in a suitable mounting or bearing arrangement as indicated at 32 in FIG. 1. The tube 26 can be rotated by means of a rotary knob or handle 34 for lengthwise displacement of the nut 30 on the tube 26.

In accordance with the invention, the slider 18 is designed to be adjustable in respect of its length, for the purposes of height adjustment of the seat portion 60. In the illustrated embodiment, such adjustment is provided by means of a rod or bar 36 which extends through the interior of the tube 26, as can be clearly seen from FIG. 1. The bar 36 has for example a hexagonal disc or plate 38 at its one end, within the rotary knob 34, while at its other end it is nonrotatably connected to a screwthreaded pin portion 40 on to which is screwed an internally screwthreaded sleeve 42 of a member 44 which carries the roller 20.

Figure 3:
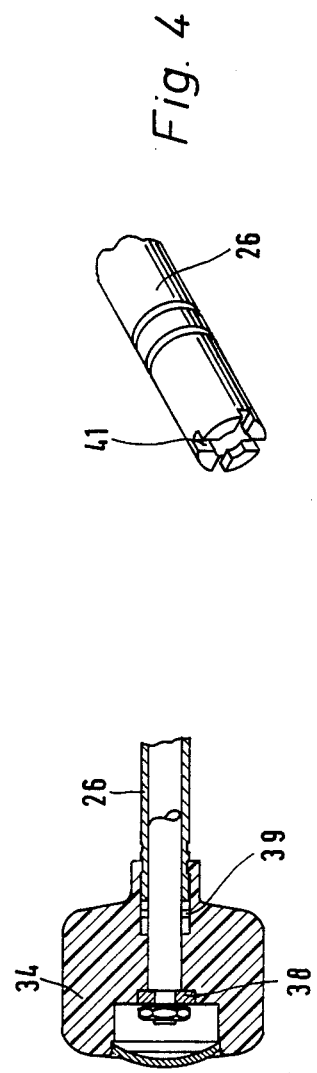
FIG. 3 is a view of a detail of the seat adjusting mechanism.

As shown in FIGS. 3 ad 4, the rotary knob 34 carries a connecting portion 39 such as a web portion which is arranged to engage into slots 41 provided in the end face of the tube 26, as shown in FIG. 3. The knob 34 further has a recess adjacent the hexagonal disc or plate 38 and of such a configuration as to be capable of cooperating therewith.

When the knob 34 is displaced axially towards the left in FIG. 1 and thus also in FIG. 3, it is non-rotatably connected to the bar 36 by way of the disc or plate 38 and the co-operating recess, while the connection to the tube 26 by way of the portion 39 and the slots 41 is released, so that the screwthreaded pin 40 can thus be rotated by turning the knob 34 and thereby the screwthreaded pin portion 40 because the roller 20 embraces the cam lever 10 on both sides, by virtue of the cam lever 10 fitting into a groove in the periphery of the roller, as can be seen from FIG. 2, thereby preventing the screwthreaded sleeve 42 from rotating.

It will be readily apparent that, with the same degree of spring biasing effect and with the same weight on the seat portion 60, the point of engagement of the roller 20 against the cam surface 22 of the cam lever 10 is only dependent on the length of the slider 18 so that heightwise adjustment of the seat portion 60 can be easily effected by means of length adjustment of the slider 18. As indicated above, by suitable selection of the cam configuration, it is possible to retain at least substantially the same springing characteristic, at varying heights of the seat portion 60.

It will be appreciated that the above-described construction has been set forth solely by way of example of the principles of the present invention and that various modifications and variations may be made therein without thereby departing from the spirit and scope of the present invention.

What is claimed is:

1. A seat comprising:

base frame means;

a seat portion;

first and second support assemblies connecting the seat portion to the base frame means in a variable-height manner, each said assembly including first and second mutually crossing support arms each having first and second ends, the first end of each said arm being connected slidably to one of said seat portion and said base frame means and the second end of each said arm being non-slidably connected to the other of said seat portion and said base frame means, the second ends of said arms of said support assemblies being interconnected by a shaft;

a cam lever operatively connected non-rotatably to said second ends of the arm of each assembly, said cam lever being fixedly mounted on said shaft intermediate said second ends of said arm;

a slider having first and second ends, the first end thereof co-operating with said cam lever;

a spring means having first and second ends, the first end being secured to one of said seat portion and said base frame and the second end of said spring means being secured to the slider, thereby to support said seat portion in relation to said base frame means; and means for heightwise adjustment of the seat portion, including means for adjusting the slider in respect of its length.

2. A seat as set forth in claim 1 wherein the cam configuration of said cam lever is such that the sprinring characteristic of the seat is at least substantially the same at varying heights of said seat portion.

3. A seat as set forth in claim 1 wherein said spring means comprises at least one coil tension spring.

4. A seat as set forth in claim 1 wherein said cam lever, said slider, said spring means and said height adjustment means are disposed in association with said base frame means.

5. A seat comprising: a base frame means; a seat portion; a support arrangement for supporting the seat portion relative to the base frame means in a variable-height fashion, said support arrangement comprising first and second support assemblies disposed at a spacing from each other transversely of the seat, each said assembly comprising first and second mutually intersecting support arms each having first and second ends, the first end of each said arm being connected to said seat portion slidably relative thereto in the longitudinal direction of the seat and the second end of each said arm being connected to said base frame means non-slidably but rotatably relative thereto; a cam means operatively connected to said second ends of said arms non-rotatably relative thereto; a slider means slidable in the longitudinal direction of the seat and having first and second end portions, the first end portion co-operating with said cam means; a spring means operatively connected between said base frame means and said slider at a location at least adjacent said second end portion thereof, thereby to support said seat portion in relation to said base frame means; and an arrangement for heightwise adjustment of said seat portion relative to said base frame means, comprising means for adjusting the operative length of said slider means between said first end and said location adjacent said second end portion thereof.

6. A seat comprising: a base frame means; a seat portion; a support arrangement for supporting the seat portion relative to the base frame means in a variable-height fashion, said support arrangement comprising first and second support assemblies disposed at a spacing from each other transversely of the seal, each said assembly comprising first and second mutually intersecting support arms each having first and second ends, the first end of each said arm being connected to said base frame means slidably relative thereto in the longitudinal direction of the seat and the second end of each said arm being connected to said seat portion non-slidably but rotatably relative thereto; a cam means operatively connected to said second ends of said arms non-rotatably relative thereto; a slider means slidable in the longitudinal direction of the seat and having first and second end portions, the first end portion co-operating with said cam means; a spring means operatively connected between said seat portion and said slider means at a location at least adjacent said second end portion thereof, thereby to support said seat portion in relation to said base frame means; and an arrangement for heightwise adjustment of said seat portion relative to said base frame means, comprising means for adjusting the operative length of said slider means between said first end and said location adjacent said second end portion thereof.

* * * * *

UNITED STATES PATENT AND TRADEMARK OFFICE
CERTIFICATE OF CORRECTION

PATENT NO. : 4,786,024

DATED : November 22, 1988

INVENTOR(S) : Leo Goetz

It is certified that error appears in the above-identified patent and that said Letters Patent is hereby corrected as shown below:

Column 1, line 11, after "support", change "amrs" to --arms--

Column 1, line 28, after "frame", insert --.--

Column 2, line 22, before "twelve", change "one" to --some--

Column 3, line 33, before "arm", insert --support--

Column 3, line 53, after "is", change "deposed" to --disposed--

Column 3, line 66, before "direction", change "foreand-aft" to --fore-and-aft--

UNITED STATES PATENT AND TRADEMARK OFFICE
CERTIFICATE OF CORRECTION

PATENT NO. : 4,786,024

DATED : November 22, 1988

INVENTOR(S) : Leo Goetz

It is certified that error appears in the above-identified patent and that said Letters Patent is hereby corrected as shown below:

Col. 4, line 53, before "pin portion 40", insert --sleeve 42 can be moved backwards or forwards on the screwthreaded--

Col. 5, line 26, after "of said", change "arm" to --arms--

Col. 6, line 29, after "the", change "seal" to --seat--

Signed and Sealed this

Twenty-second Day of August, 1989

Attest:

DONALD J. QUIGG

Attesting Officer

Commissioner of Patents and Trademarks